(12) United States Patent
Murphy et al.

(10) Patent No.: US 8,769,049 B2
(45) Date of Patent: Jul. 1, 2014

(54) INTELLIGENT TIERS OF BACKUP DATA

(75) Inventors: Elissa E. S. Murphy, Seattle, WA (US); John D. Mehr, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 12/430,015

(22) Filed: Apr. 24, 2009

(65) Prior Publication Data

US 2010/0274983 A1 Oct. 28, 2010

(51) Int. Cl.
| | | |
|---|---|---|
| G06F 15/16 | (2006.01) | |
| G06F 15/177 | (2006.01) | |
| G06F 17/30 | (2006.01) | |
| G06F 11/14 | (2006.01) | |
| G06F 11/34 | (2006.01) | |

(52) U.S. Cl.
CPC ...... *G06F 11/1464* (2013.01); *G06F 2201/875* (2013.01); *G06F 2201/815* (2013.01); *G06F 11/1451* (2013.01); *G06F 11/3485* (2013.01); *G06F 11/3495* (2013.01); *G06F 2201/885* (2013.01); *G06F 2201/86* (2013.01); *G06F 11/3433* (2013.01); *G06F 11/1456* (2013.01)
USPC .......................... 709/219; 709/220; 707/637

(58) Field of Classification Search
USPC ....................................................... 709/219
See application file for complete search history.

(56) References Cited

U.S. PATENT DOCUMENTS

| | | | |
|---|---|---|---|
| 5,239,647 A * | 8/1993 | Anglin et al. ........................ | 1/1 |
| 5,410,671 A | 4/1995 | Elgamal et al. | |
| 5,701,480 A | 12/1997 | Raz | |
| 5,924,096 A | 7/1999 | Draper et al. | |
| 6,167,427 A | 12/2000 | Rabinovich et al. | |
| 6,256,675 B1 * | 7/2001 | Rabinovich ................... | 709/241 |
| 6,405,219 B2 | 6/2002 | Saether et al. | |
| 6,463,454 B1 | 10/2002 | Lumelsky et al. | |
| 6,466,980 B1 | 10/2002 | Lumelsky et al. | |
| 6,516,350 B1 * | 2/2003 | Lumelsky et al. ............ | 709/226 |
| 6,728,849 B2 | 4/2004 | Kodama | |

(Continued)

FOREIGN PATENT DOCUMENTS

| | | |
|---|---|---|
| JP | 200659308 | 9/1994 |
| JP | 2003-280950 | 10/2003 |

(Continued)

OTHER PUBLICATIONS

Kaczmarski, Jiang & Pease, "Beyond backup toward storage management", IBM Systems Journal, vol. 42, No. 2, 2003, pp. 322-337.*

(Continued)

*Primary Examiner* — Emmanuel L Moise
*Assistant Examiner* — Robert Shaw
(74) *Attorney, Agent, or Firm* — Bryan Webster; David Andrews; Micky Minhas

(57) ABSTRACT

The claimed subject matter relates to systems and/or methodologies that facilitate intelligent distribution of backup information across storage locations in network-based backup architectures. A virtual layering of backup information across storage locations in the backup architecture can be implemented. Statistical models are utilized to dynamically re-allocate backup information among storage locations and/or layers to ensure availability of data, minimum latency upon restore, and minimum bandwidth utilization upon restore. In addition, heuristics or machine learning techniques can be applied to proactively detect failures or other changes in storage locations such that backup information can be reallocated accordingly prior to a failure.

18 Claims, 10 Drawing Sheets

(56) References Cited

U.S. PATENT DOCUMENTS

| | | | |
|---|---|---|---|
| 6,785,786 B1* | 8/2004 | Gold et al. | 711/162 |
| 6,880,002 B2 | 4/2005 | Hirschfeld | |
| 6,950,871 B1 | 9/2005 | Honma et al. | |
| 7,020,665 B2 | 3/2006 | Douceur et al. | |
| 7,023,974 B1 | 4/2006 | Brannam et al. | |
| 7,054,910 B1 | 5/2006 | Nordin et al. | |
| 7,103,740 B1 | 9/2006 | Colgrove et al. | |
| 7,136,903 B1 | 11/2006 | Phillips et al. | |
| 7,155,463 B1 | 12/2006 | Wang et al. | |
| 7,159,050 B2 | 1/2007 | Miyata et al. | |
| 7,219,191 B2 | 5/2007 | Takamoto et al. | |
| 7,334,062 B1 | 2/2008 | Agarwal et al. | |
| 7,370,336 B2 | 5/2008 | Husain et al. | |
| 7,383,381 B1* | 6/2008 | Faulkner et al. | 711/114 |
| 7,392,421 B1* | 6/2008 | Bloomstein et al. | 714/4.4 |
| 7,461,230 B1* | 12/2008 | Gupta et al. | 711/170 |
| 7,529,785 B1* | 5/2009 | Spertus et al. | 1/1 |
| 7,539,708 B2 | 5/2009 | Oosaki et al. | |
| 7,636,764 B1* | 12/2009 | Fein et al. | 709/212 |
| 7,653,668 B1 | 1/2010 | Shelat et al. | |
| 7,657,582 B1* | 2/2010 | Cram et al. | 707/640 |
| 7,685,109 B1* | 3/2010 | Ransil et al. | 707/999.003 |
| 7,693,877 B1* | 4/2010 | Zasman | 707/707 |
| 7,739,233 B1 | 6/2010 | Ghemawat et al. | |
| 7,783,600 B1* | 8/2010 | Spertus et al. | 707/622 |
| 7,805,407 B1 | 9/2010 | Verbeke et al. | |
| 7,827,214 B1 | 11/2010 | Ghemawat et al. | |
| 7,836,017 B1 | 11/2010 | Srinivasan et al. | |
| 7,925,623 B2 | 4/2011 | Therrien et al. | |
| 7,941,619 B1 | 5/2011 | Rossi | |
| 2002/0055972 A1 | 5/2002 | Weinman, Jr. | |
| 2002/0107877 A1 | 8/2002 | Whiting et al. | |
| 2002/0156974 A1* | 10/2002 | Ulrich et al. | 711/114 |
| 2003/0105810 A1* | 6/2003 | McCrory et al. | 709/203 |
| 2003/0110263 A1* | 6/2003 | Shillo | 709/226 |
| 2003/0135514 A1 | 7/2003 | Patel et al. | |
| 2003/0167295 A1 | 9/2003 | Choo | |
| 2003/0177176 A1 | 9/2003 | Hirschfeld et al. | |
| 2003/0212872 A1* | 11/2003 | Patterson et al. | 711/165 |
| 2004/0003107 A1 | 1/2004 | Barham et al. | |
| 2004/0030731 A1 | 2/2004 | Iftode et al. | |
| 2004/0047354 A1 | 3/2004 | Slater et al. | |
| 2004/0049700 A1 | 3/2004 | Yoshida | |
| 2004/0064633 A1 | 4/2004 | Oota | |
| 2004/0088331 A1 | 5/2004 | Therrien et al. | |
| 2004/0122741 A1 | 6/2004 | Sidman | |
| 2004/0193659 A1* | 9/2004 | Carlson et al. | 707/204 |
| 2004/0210591 A1 | 10/2004 | Hirschfeld et al. | |
| 2005/0108565 A1 | 5/2005 | Blea et al. | |
| 2005/0120058 A1* | 6/2005 | Nishio | 707/200 |
| 2005/0132257 A1 | 6/2005 | Gold et al. | |
| 2005/0144195 A1* | 6/2005 | Hesselink et al. | 707/201 |
| 2005/0154697 A1 | 7/2005 | Altaf et al. | |
| 2005/0193239 A1* | 9/2005 | Shackelford | 714/7 |
| 2005/0246398 A1 | 11/2005 | Barzilai et al. | |
| 2005/0262097 A1 | 11/2005 | Sim-Tang et al. | |
| 2005/0283487 A1 | 12/2005 | Karlsson et al. | |
| 2006/0010169 A1 | 1/2006 | Kitamura | |
| 2006/0064416 A1* | 3/2006 | Sim-Tang | 707/6 |
| 2006/0149901 A1* | 7/2006 | Sasage et al. | 711/114 |
| 2006/0179061 A1* | 8/2006 | D'Souza et al. | 707/10 |
| 2006/0190243 A1* | 8/2006 | Barkai et al. | 704/8 |
| 2006/0230076 A1* | 10/2006 | Gounares et al. | 707/200 |
| 2006/0242155 A1 | 10/2006 | Moore et al. | |
| 2006/0253504 A1 | 11/2006 | Lee et al. | |
| 2006/0265490 A1 | 11/2006 | Pishevar et al. | |
| 2006/0271530 A1 | 11/2006 | Bauer | |
| 2006/0271601 A1 | 11/2006 | Fatula et al. | |
| 2007/0022122 A1 | 1/2007 | Bahar et al. | |
| 2007/0027916 A1 | 2/2007 | Chen et al. | |
| 2007/0043787 A1* | 2/2007 | Cannon et al. | 707/203 |
| 2007/0079004 A1* | 4/2007 | Tatemura et al. | 709/238 |
| 2007/0083725 A1 | 4/2007 | Kasiolas et al. | |
| 2007/0094269 A1 | 4/2007 | Mikesell et al. | |
| 2007/0113032 A1* | 5/2007 | Kameyama et al. | 711/162 |
| 2007/0136541 A1* | 6/2007 | Herz et al. | 711/162 |
| 2007/0143371 A1 | 6/2007 | Kottomtharayil | |
| 2007/0207729 A1 | 9/2007 | Chen et al. | |
| 2007/0208748 A1 | 9/2007 | Li | |
| 2007/0244894 A1 | 10/2007 | St. Jacques | |
| 2007/0244920 A1* | 10/2007 | Palliyil et al. | 707/102 |
| 2007/0245103 A1 | 10/2007 | Lam et al. | |
| 2007/0250519 A1 | 10/2007 | Fineberg et al. | |
| 2007/0294719 A1 | 12/2007 | Jost | |
| 2008/0005334 A1* | 1/2008 | Utard et al. | 709/226 |
| 2008/0052328 A1* | 2/2008 | Widhelm et al. | 707/204 |
| 2008/0065704 A1* | 3/2008 | MacCormick et al. | 707/204 |
| 2008/0104107 A1 | 5/2008 | Schwaab et al. | |
| 2008/0147836 A1* | 6/2008 | Littlefield et al. | 709/223 |
| 2008/0178179 A1* | 7/2008 | Natarajan et al. | 718/102 |
| 2008/0183891 A1* | 7/2008 | Ni et al. | 709/239 |
| 2008/0198752 A1* | 8/2008 | Fan et al. | 370/238 |
| 2008/0209144 A1 | 8/2008 | Fujimoto | |
| 2008/0215663 A1* | 9/2008 | Ushiyama | 709/201 |
| 2008/0222154 A1* | 9/2008 | Harrington et al. | 707/10 |
| 2008/0222346 A1 | 9/2008 | Raciborski et al. | |
| 2008/0235331 A1 | 9/2008 | Melamed et al. | |
| 2008/0256138 A1* | 10/2008 | Sim-Tang | 707/202 |
| 2008/0301132 A1 | 12/2008 | Yamada et al. | |
| 2009/0007241 A1* | 1/2009 | Tewari et al. | 726/4 |
| 2009/0164533 A1 | 6/2009 | Hubbard | |
| 2009/0182955 A1 | 7/2009 | Cherukuri | |
| 2009/0198825 A1* | 8/2009 | Miller et al. | 709/230 |
| 2009/0234917 A1 | 9/2009 | Despotovic et al. | |
| 2009/0265473 A1* | 10/2009 | Hydrie et al. | 709/229 |
| 2009/0292871 A1* | 11/2009 | Watanabe et al. | 711/114 |
| 2009/0300079 A1* | 12/2009 | Shitomi | 707/204 |
| 2010/0034211 A1 | 2/2010 | Yanagihara | |

FOREIGN PATENT DOCUMENTS

| | | | | |
|---|---|---|---|---|
| JP | 2004046874 A | * | 12/2004 | G06F 13/00 |
| JP | 2005-215735 | | 8/2005 | |
| JP | 2006-350470 | | 12/2006 | |
| JP | 2007018407 A | * | 1/2007 | G06F 3/06 |
| WO | 2004/053696 | | 6/2004 | |
| WO | 2007088084 | | 8/2007 | |

OTHER PUBLICATIONS

L. Qiu, V. Padmanabhan, and G. Voelker. On the Placement of Web Server Replicas. In Proceedings of IEEE INFOCOM, Apr. 2000, pp. 1587-1596.*

Kangasharju, Ross & Turner—Adaptive content management in Structured P2P Communities, International Conference on Scalable Information Systems, Hong Kong (2006).*

Dilley et al. "Globally Distributed Content Delivery", IEEE Internet Computing, IEEE (Sep.-Oct. 2002) p. 50-58.*

Phan et al. "Evolving Toward the Perfect Schedule: Co-scheduling Job Assignments and Data Replication in Wide-Area Systems Using a Genetic Algorithm," 11th Workshop on Job Scheduling Strategies for Parallel Processing, Cambridge Mass., Jun. 2005.*

Dimakis et al, Network Coding for Distributed Systems (Mar. 2008).*

Szymaniak et al, "Latency-Driven Replica Placement", IPSJ Journal, (Aug. 2006) source: http://www.globule.org/publi/LDRP_ipsj2006.html.*

Dilley et al, Globally Distributed Content Delivery, IEEE Internet Computing, (Oct. 2002).*

Androutsellis-Theotokis and Spinellis, A Survey of Peer-to-Peer Content Distribution Technologies, ACM Computing Surveys, vol. 36, No. 4, Dec. 2004, pp. 335-371.*

Loukopoulos & Ahmad, "Static and adaptive distributed data replication using genetic algorithms", J. Parallel Distrib. Comput. 64, Elsevier, (2004) pp. 1270-1285.*

Mao et al. "QoS oriented dynamic replica cost model for P2P computing," Distributed 25th IEEE International Conference on Computing Systems Workshops, Jun. 2005.*

Tewari & Adam, "Distributed File Allocation with Consistency Constraints", Proceedings of the International Conference on Distributed Computing Systems (1992).*

(56) References Cited

OTHER PUBLICATIONS

Ripeanu and Foster, A Decentralized, Adaptive Replica Location Mechanism, Proceedings of the 11th IEEE International Symposium on High Performance Distributed Computing (HPDC-11), 2002.*
Karlsson and Karamanolis, Choosing Replica Placement Heuristics for Wide-Area Systems, in: Proceedings of the 24th International Conference on Distributed Computing Systems (ICDCS'04), IEEE, 2004.*
Karlsson and Karamanolis, Bounds on the Replication Cost for QoS,HP Tech.Report HPL-2003-156, (Jul. 2003).*
Karlsson et al A Framework for Evaluating Replica Placement Algorithms, HP Tech.Report HPL-2002-219 (Aug. 2002 ).*
L. Qiu, et al,. On the Placement of Web Server Replicas. In Proceedings of IEEE INFOCOM, Apr. 2000, pp. 1587-1596.*
Ye & Chiu, "Peer-to-Peer Replication with Preferences", InfoScale 2007, Jun. 6-8, 2007, Suzhou, China, ACM (2007).*
R. Casey, Allocation of copies of a file in an information network, AFIPS (1972).*
Dowdy & Foster, Comparative Models of the File Assignment Problem, ACM Computing Surveys, vol. 14, No. 2, (Jun. 1982).*
K. Chandy and J. Hewes, "File Allocation in Distributed Systems," in Proceedings of the International Symposium on Computer Performance Modeling, Measurement and Evaluation, Mar. 1976, pp. 10-13.*
Mahmoud & Riordon, Optimal Allocation of Resources in Distributed Information Networks, ACM Transactions on Database Systems, vol. 1, No. 1, Mar. 1976, pp. 66-78.*
Tang & Yang, Differentiated Object Placement for Self-Organizing Storage Clusters, Technical Report 2002-32, UCSB, (Nov. 2002).*
Tang et al—Sorrento: A Self-Organizing Storage Cluster for Parallel Data-Intensive Applications, Technical Report 2003-30, UCSB, (2003).*
Kangasharju et al—Adaptive content management in Structured P2P Communities, International Conference on Scalable Information Systems, Hong Kong (2006).*
Ranganathan and Foster, "Identifying Dynamic Replication Strategies for a High-Performance Data Grid", LNCS 2242, Springer-Verlag, 2001, pp. 75-86.*
Ranganathan et al. Improving Data Availability through Dynamic Model-Driven Replication in Large Peer-to-Peer Communities, Proceedings of the 2nd IEEE/ACM International Symposium on Cluster Computing and the Grid (CCGRID.02), 2002.*
Xiao et al , Distributed Proximity-Aware Peer Clustering in BitTorrent-Like Peer-to-Peer Networks, in: EUC 2006, LNCS 4096, SpringerLink (2006) pp. 375-384.*
Rabinovich et al "Dynamic Replication on the Internet", AT&T Labs (Mar. 1998).*
M. Rabinovich and A. Aggarwal, "RaDaR: A Scalable Architecture for a Global Web Hosting Service," in Proceedings of the 8th International World Wide Web Conference, May 1999, pp. 1545-1561.*
Kaczmarski et al, "Beyond backup toward storage management", IBM Systems Journal, vol. 42, No. 2, 2003, pp. 322-337.*
1)Karlsson et al A Framework for Evaluating Replica Placement Algorithms, HP Tech Report HPL-2002-219 (Aug. 2002).*
Bartolini et al "Optimal dynamic replica placement in Content Delivery Networks," in Proceedings of the 11th IEEE International Conference on Networks, ICON 2003, (Sydney, Australia), pp. 125-130, Sep. 28-Oct. 1, 2003.*
Karlsson et al A Framework for Evaluating Replica Placement Algorithms, HP Tech Report HPL-2002-219 (Aug. 2002).*
Zhipeng & Dan, Dynamic Replication Strategies for Object Storage Systems in: EUC Workshops 2006, LNCS 4097, SpringerLink (2006) pp. 53-61.*
On et al. "QoS-Controlled Dynamic Replication in Peer-to-Peer Systems", Proceedings of Third International Conference on Peer-to-Peer Computing, 2003.*
Chu et al—Optimal File Allocation in a Multiple Computer System, IEEE Transactions on Computers, vol. C-18, No. 10, Oct. 1969, pp. 885-889.*
LoPresti et al, Dynamic Replica Placement in Content Delivery Networks, Proceedings of the 13th IEEE International Symposium on Modeling, Analysis, and Simulation of Computer and Telecommunication Systems (MASCOTS'05) (2005).*
Szymaniak et al, "Latency-Driven Replica Placement", Szymaniak et al, Latency-Driven Replica Placement, IEEE International Symposium on Applications and the Internet, (Feb. 2005) source: http://www.globule.org/publi/LDRP_saint2005-2.pdf.*
Zhao et al, Tapestry: An Infrastructure for Fault-tolerant Wide Area Location and Routing, Report No. UCB/CSD-01-1141, Apr. 2001.
Tewari & Adam, Distributed File Allocation with Consistency Constraints, IEEE, Proceedings of the International Conference on Distributed Computer (1992), pp. 408-415.
Weatherspoon et al, Introspective Failure Analysis: Avoiding Correlated Failures in Peer-to-Peer Systems, IEEE (2002).
Sanchez-Artigas et al., A Comparative Study of Hierarchical DHT Systems in: 32nd IEEE Conference on Local Computer Networks, IEEE (2007).
L. Garces-Ercie et al., Hierarchical P2P Systems, ACM/IFIP Conference on Parallel and Distributed Computing (Euro-Par), 2003.
J. Kangasharju, K.W. Ross, and D.A. Turner, Optimal Content Replication in P2P COmmunities, 2002.
Jorden, E., Project Prioritization and Selection: The Disaster Scenario, In Proceedings of the 32nd Annual Hawaii International Conference on Systems Sciences (HICSS-32), Maui, Hawaii, Jan. 1999.
Abawajy, Placement of File Replicas in Data Grid Environment ICCS 2004, LNCS 3038, Springer-Verlag, 2004, pp. 66-73.
Stockinger, H., A. Samar, B. Allcock, I. Foster, K. Holtman, B. Tierney, File and Object Replication in Data Grids, 10th IEEE Symposium on High Performance and Distributed Computing (2001).
Hoschek, W, Janez, F.J., A. Samar, H. Stockinger, K. Stockinger, Data Management in an International Data Grid Project, Proceedings of GRID Workshop (2000) 77-90.
Translation of JP 2005-201248-A, Hiroyuk Ichikawa (Jan. 2007), 37 pages.
Feng Mao, Hai Jin, Deqin Zou, Baoli Chen, Li Qui, "Qos Oriented Dynamic Replica Cost Model for P2P Computing", Distributed 25th IEEE International Conference on Computing Systems Workshops, Jun. 6-10, 2005 pp. 822-828.
Ellard et al., Attribute-Based Prediction of File Properties, Tech. Report TR-14-03, Harvard University, Cambridge, MA, 2004.
Ye and Chiu, Peer-to-Peer Replication With Preferences, Infoscale 2007 Jun. 6-8, 2007, Suzhou, China, ACM, 2007.
On et al., "Quality of Availability: Replica Placement for Widely Distributed Systems", Proceedings of the 11th International Conference on Quality of Service (IWQoS2003), Lecture Notes in Computer Science 2707 Sprinter-Verlad (2003), pp. 324-352.
Rabin, "Efficient Dispersal of Information for Security, Load Balancing, and Fault Tolerance", Journal of the Association for COmputing Machinery, vol. 36, No. 2, Apr. 1989, pp. 335-348.
Dowdy and Foster, Comparative Models of the File Assignment Problem, Computing Survey, vol. 14, No. 2, ACM, Jun. 1982, 287-303.
Karlsson and Karamanolis, "Bounds on the Replication Cost for QoS", Technical Report HPL-2003-156, Hewlett Packard Labs, Jul. 2003.
Tang and Yang, Differentiated Object Placement for Self Organizing Storage Cluster, USCB, 2002.
Compellent Technologies Inc., Datasheet of Data Progression Storage Center, 2008, http://www.mgbsinc.com/NWESITEFILES/Compellent/MGBS-Compellent-DataProgression-2008.
Office Action Mailed May 23, 2011 regarding U.S. Appl. No. 12/430,010, 96 pages.
Office Action Mailed Jul. 25, 2011 regarding U.S. Appl. No. 12/430,010, 69 pages.
Final Office Action Mailed Feb. 1, 2012 regarding U.S. Appl. No. 12/430,018, 100 pages.
Final Office Action Mailed Mar. 28, 2012 regarding U.S. Appl. No. 12/430,010, 57 pages.
Office Action Mailed Jun. 18, 2012 regarding U.S. Appl. No. 12/430,018, 97 pages.
Office Action Mailed May 26, 2011 regarding U.S. Appl. No. 12/430,012, 89 pages.

(56) References Cited

OTHER PUBLICATIONS

Final Office Action Mailed Apr. 13, 2012 regarding U.S. Appl. No. 12/430,012, 72 pages.
PCT Appl. No. PCT/US2010/031942, Search Report Dated Nov. 8, 2010, 3 pages.
PCT Appl. No. PCT/US2010/031939, Search Report Dated Nov. 30, 2010, 4 pages.
PCT Appl. No. PCT/US2010/031939 Written Opinion, Dated Nov. 30, 2010, 5 pages.
PCT Appl. No. PCT/US2010/031939 International Preliminary Report on Patentability, dated Oct. 25, 2011, 6 pages.
PCT Appl. No. PCT/US2010/031942, Written Opinion, Dated Nov. 8, 2010, 4 pages.
PCT Appl. No. PCT/US2010/031942, International Preliminary Report on Patentability, Dated Oct. 25, 2011, 5 pages.
Notice of Allowance and Fee(s) Due mailed Jul. 22, 2013 in U.S. Appl. No. 12/430,018; 4 pages.
Karlsson et al. A Framework for Evaluating Replica Placement Algorithms, HP Tech Report HPL-2002-219 (Aug. 2002).
Ye & Chiu, Peer-to-Peer Replication with Preferences, InfoScale 2007, Jun. 6-8, 2007, Suzhou, China, ACM (2007).
Final Office Action mailed Nov. 30, 2012 in U.S. Appl. No. 12/430,018; 87 pages.
Non-Final Office Action mailed Nov. 5, 2012 in U.S. Appl. No. 12/430,012; 114 pages.
Non-Final Office Action mailed Oct. 23, 2012 re U.S. Appl. No. 12/430,010, 98 pages.
Final Office Action mailed Jun. 21, 2013 in U.S. Appl. No. 12/430,012; 109 pages.
Final Office Action mailed Jun. 10, 2013 in U.S. Appl. No. 12/430,010; 99 pages.
Barr, et al., pStore: A Secure Distributed Backup System, http://kbarr.net/static/pstore/progress.pdf, 10 pages, (2001).
Distributed Version Control and Library Metadata, http://journal.code4lib.org/articles/86, last accessed Jan. 22, 2009, 9 pages.
Peer-to-Peer Replication, http://publib.boulder.ibm.com/infocenter/db2luw/v9r5/index.jsp?topic=/com.ibm.swg.im.iis.repl.qrepl.doc/topics/iiyrosubcp2pconc.html, last accessed Jan. 22, 2009, 5 pages.
Auvray,Distributed Version Control Systems: A Not-So-Quick Guide Through, http://www.infoq.com/articles/dvcs-guide, last accessed Jan. 22, 2009, 18 pages.
Stefansson, MyriadStore: A Peer-to-Peer Backup System, http://myriadstore.sics.se/docs/mstorethesis.pdf, Jun. 2006, 86 pages.
Li, et al., Erasure Resilient Codes in Peer-to-Peer Storage Cloud, http://ieeexplore.ieee.org/stamp/stamp.jsp?arnumber=01660948 4 pages ICASSP 2006, IEEE (2006).
DFSgc: Distributed File System for Multipurpose Grid Applications and Cloud Computing, http://www.cyfronet.pl/cgw08/presentations/c2-4.pdf, 18 pages, (2008).
Harris, De-duplicating Primary Storage, http://storagemojo.com/2008/09/30/de-duplicating-primary-storage/, last accessed on Jan. 22, 2009 18 pages.
Graham, Cloud Optimized Storage Solutions: Neural Networks and Heuristics, http://flickerdown.com/2009/01/cloud-optimized-storage-solutions-neural-networks-and-heuristics/, Jan. 19, 2009, 10 pages.
Storage Optimization, http://storageoptimization.wordpress.com/, last accessed on 1-22-099 9 pages.
Backup, the New Storage Tiers and Real Snapshots, http://blogs.netapp.com/extensible_netapp/iops/index.html, Dec. 15, 2008, 5 pages.
Distributed Backup Solution for Corporate Networks, http://www.handybackup.net/distributed-backup-system.shtml, last accessed on 2 pages, (Jan. 22, 2009).
Douceour, Large-scale Simulation of Replica Placement Algorithms for a Sewerless Distributed File System, http://ieeexplore.ieee.org/stamp/stamp.jsp?arnumber=948882&isnumber=20512, Jan. 22, 2009, 10 pages.
McCue, et al., Computing Replica Placement in Distributed Systems, http://ieeexplore.ieee.org/stamp/stamp.jsp?arnumber=242617&isnumber=6238, Jan. 22, 2009, 4 pages.
MacCormick, et al., Kinesis: A New Approach to Replica Placement in Distributed Storage Systems, http://research.microsoft.com/pubs/76149/Kinesis.pdf, 14 pages, in Transactions on Storage (2008).
Yu, et al., Minimal Replication Cost for Availability, http://www.comp.nus.edu.sg/~yuhf/podc02.pdf, 10 pages, *PODC 2002* ACM (2002).
Chen, et al. SCAN: A Dynamic, Scalable, and Efficient Content Distribution Network, http://sahara.cs.berkeley.edu/papers/CKK02b.ps, 15 pages, In Proc. of International Conf. on Pervasive Computing (2000).
Presti, et al. Dynamic Replica Placement in Content Delivery Networks, http://ieeexplore.ieee.org/stamp/stamp.jsp?arnumber=01521155, 10 pages, (*MASCOT* '05) IEEE (2005).
Chun, et al. Efficient Replica Maintenance for Distributed Storage Systems, http://oceanstore.cs.berkeley.edu/publications/papers/pdf/carbonite06.pdf, 14 pages, Proc. of the 3rd Symposium on Networked Systems Design and Implementation,, 2006.
Oracle, Oracle Database Backup in the Cloud, http://www.oracle.com/technology/tech/cloud/pdf/cloud-backup-whitepaper.pdf, 12 pages, Sep. 2008.
Japanese Office Action dated Jan. 15, 2014 re 2012-507360, 3 pages.
Japanese Office Action dated Dec. 25, 2013 re App. No. 2012-507361.

\* cited by examiner

INTELLIGENT TIERS OF BACKUP DATA

BACKGROUND

As computing devices become more prevalent and widely used among the general population, the amount of data generated and utilized by such devices has rapidly increased. For example, recent advancements in computing and data storage technology have enabled even the most limited form-factor devices to store and process large amounts of information for a variety of data-hungry applications such as document editing, media processing, and the like. Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing system and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage, where the respective versions can later be retrieved for restoration. However, a sizeable amount of data is generally transmitted over the network in such an example, thereby consuming expensive bandwidth. In view of the foregoing, it would be desirable to implement network-based backup techniques with improved efficiency.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methodologies that facilitate intelligent distribution of backup information across storage locations in network-based backup architectures. A virtual layering of backup information across storage locations in the backup architecture can be implemented. Statistical models are utilized to dynamically reallocate backup information among storage locations and/or layers to ensure availability of data, minimum latency upon restore, and minimum bandwidth utilization upon restore. Backup information can be monitored to discover access trends over time. In addition, storage locations can be monitored to identify health, storage capacity, bandwidth, and so on. Information gathered through monitoring can be applied to heuristics related to access patterns and/or machine learning mechanisms to factor data lifespan into distribution decisions. In another example, machine learning techniques can be applied to proactively detect failures or other changes in storage locations such that backup information can be reallocated accordingly prior to a failure or other incident.

In accordance with one aspect, a hybrid backup architecture can be employed wherein backup data can be retained on a global location within a network or internetwork (e.g., a "cloud") as well as one or more peers. Accordingly, some or all backup data can be obtained from either the cloud or a nearby peer, thus reducing latency and bandwidth consumption associated with restore operations. In one example, selection of locations to be utilized for storing and/or retrieving backup information) can be selected in an intelligent and automated manner based on factors such as, but not limited to, availability of locations, network topology, location resources, or so on.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
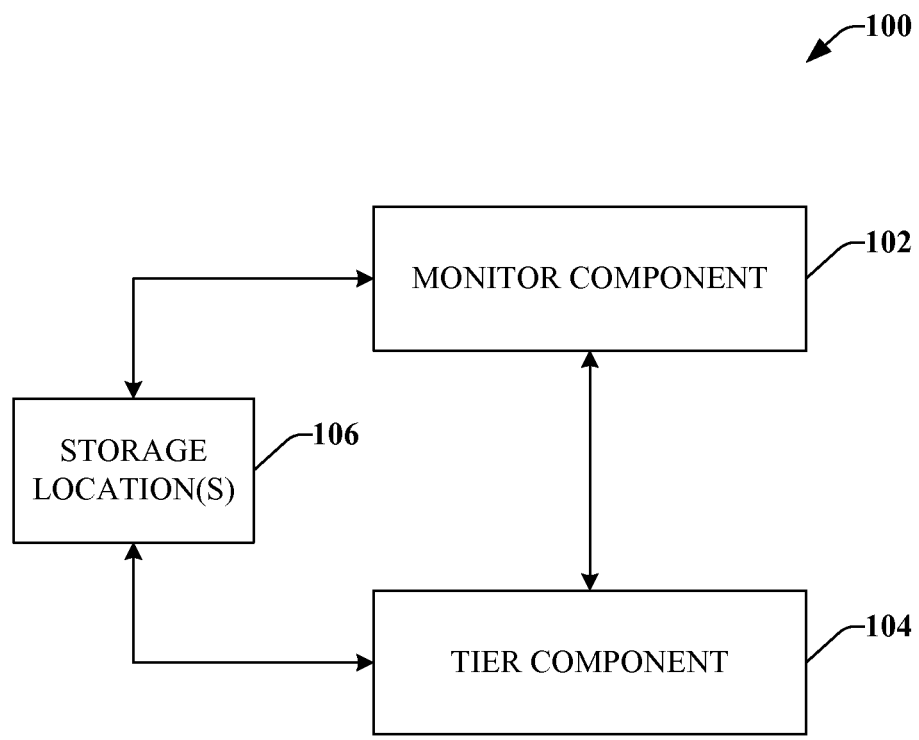
FIG. 1 illustrates a block diagram of an example system that facilitates employing intelligent re-distribution of data across storage locations in accordance with various aspects.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "cloud," "peer," "super peer," "client," and the like are intended to refer to a computer-related entity, either hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates employing intelligent re-distribution of data across storage locations in accordance with various aspects In one example, system 100 can be utilized to backup files, system images and/or other data on a client machine that implements and/or is otherwise associated with system 100. In an aspect, the client machine can be a personal computer, a laptop computer, a server, a portable digital assistant (PDA), a mobile device, a smart phone, a cell phone, a portable gaming device, a media player or any other suitable computing device that can store, manipulate and/or transfer data.

In accordance with one aspect, system 100 can be utilized in connection with a network-based or online backup solution (e.g., a cloud backup system, as described in further detail infra) that stores backup information from a client machine at one or more remote storage locations on a network or internetwork to which the client machine is associated. Conventional online backup solutions operate by maintaining a set of files obtained from a backup client at various points in the time at a remote storage location. Subsequently, restoration is conducted by retrieving one or more files from the storage locations as requested. As data and system sizes grow, necessity for space savings and bandwidth savings in transmission of backup data similarly grows.

While de-duplicating blocks of data and/or single instancing files enable more efficient storage utilization, additional optimizations can be implemented. For example, optimizations can be implemented that reduce storage costs, reduce bandwidth costs associated with transmission data around a network of locations, and reduce latency associated with restoration of data. Adaptive and/or proactive mechanisms can be employed that facilitate construction and maintenance of virtual layers or tiers of data. The tiers of data can be intelligently distributed as well as continually tuned to ensure optimal placement. For instance, data and/or storage locations can be monitored to enable dynamic re-allocation of data to ensure availability of the data while simultaneously reducing storage costs, latency upon restore, and bandwidth to restore.

Accordingly, to provide increased availability as well as lower resource utilization and costs of restoration, system 100 can intelligently tier data in a distributed backup solution. More particularly, when a user, on a client machine, selects a portion of data (e.g., a file, a system image, etc.) to be backed up, a monitor component 102 can commence evaluation of the portion of data. In addition, the monitor component 102 continually evaluates and tracks properties of other backup data stored at the storage locations 106. In one example, the monitor component 102 observes access frequency of backup data and/or time since backup data was generated. In another example, the monitor component 102 can track availability of backup data. For instance, the monitor component 102 can observe the number of replicas of a portion of backup data dispersed across storage locations 106.

In accordance with another aspect, the monitor component 102 can monitor storage locations 106 to track properties. For instance, properties can include health of respective storage locations, storage capacity (e.g., total and/or available capacity) of storage locations, availability of storage locations (e.g., downtime, uptime, etc.), bandwidth utilization of storage locations, or predicted latency times for transmission of data between respective storage locations. Such information about the storage locations can facilitate proactive re-allocation of backup data and/or adaptive distributions based upon changes to storage locations.

In accordance with another aspect, a tier component 104 can be utilized to implement virtual layers of backup data across storage locations 106. In one example, the tier component 104 can employ heuristics, machine learning, and/or other suitable artificial intelligence techniques to layer backup data. In another example, the virtual layers can be constructed relative to an origin location (e.g., a restoring client machine) such that locality of backup data is prioritized. For instance, backup data that is frequently accessed and newer (e.g., as determined by the monitor component 102, for example) can be stored a storage location that is closer to a restoring client machine on a network to reduce latency associated with restoration. Backup data that is older and/or infrequently accessed can be stored at storage locations that are more remote but offer cheaper or more abundant storage capacity (e.g., cloud). In another aspect, it is to be appreciated that the tier component 104 can emphasize availability of data that is most likely to be accessed or restored (e.g., backup data that is recently generated or frequency accessed). For example, in addition to reducing latency times and bandwidth, the tier component 104 can store copies of data likely to be restored at remote locations with abundant storage. Thus, the backup data can remain available even when a storage location with optimal locality becomes unavailable. It is to be appreciated that the tier component 104 can control the number of copies stored at less optimal locations to balance storage costs with availability.

In another aspect, the tier component 104 can proactively re-allocate backup data. For example, storage location monitoring by the monitor component 102 to detect that a client machine is experiencing critical failures or imminent threats of critical failures. In response, the tier component 104 can re-allocate data required to restore the client machine to storage locations within the virtual layers to provide optimal locality and reduce restore latency upon recovery of the client machine.

In another example, the tier component 104 can utilize information gathered by the monitor component 102. The tier component 104 can designate backup data as hot data or cold data. Hot data refers to backup data that is frequently accessed and/or recently generated (e.g., data recently backed up). The tier component 104 can infer that hot data is more likely to be restored and, accordingly, allocate such data to layers corresponding to nearest locality, minimal latency to restore and/or highest availability. Cold data, in contrast, can refer to backup information that is infrequently accessed and/or older. The tier component 104 can infer that cold data is least likely to be restored and distribute such data to locations less optimal in terms of locality but offer cheap storage.

It is to be appreciated that system 100 can include any suitable and/or necessary interface components (not shown), which provides various adapters, connectors, channels, communication paths, etc. to integrate the monitor component 102 and the tier component 104, into virtually any application, operating and/or database system(s) and/or with one another. In addition, the interface components can provide various adapters, connectors, channels, communication paths, etc., that provide for interaction with and between the monitor component 102, the tier component 104, storage locations 106 and/or any other component associated with system 100.

Figure 2:
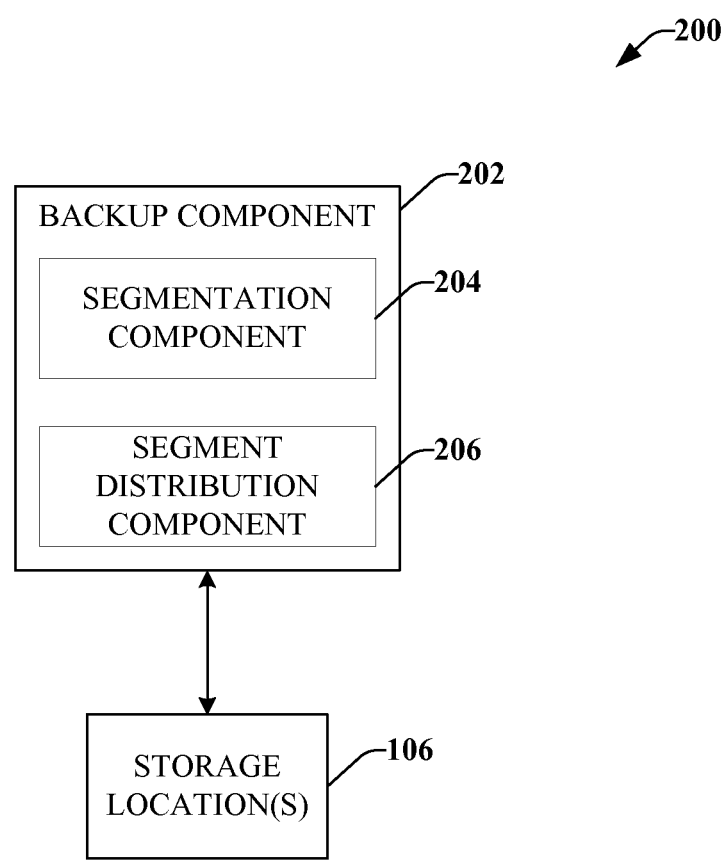
FIG. 2 illustrates a block diagram of an example system that facilitates generating backup information in accordance with various aspects.

Turning now to FIG. 2, a system 200 for generating backup information in accordance with various aspects is illustrated. As FIG. 2 illustrates, system 200 can include a backup component 202, which can generate and facilitate storage of backup copies of files, system snapshots, and/or other information associated with a backup client machine. In one example, backup component 202 can reside on and/or operate from a machine on which the client information to be backed up is located. Additionally or alternatively, backup component 202 can reside on a disparate computing device (e.g., as a remotely executed component). In one example, backup component 202 can be utilized to back up a set of files and/or other information at a regular interval in time, upon the triggering of one or more events (e.g., modification of a file), and/or based on any other suitable activating criteria.

In accordance with one aspect, backup of a file can be conducted in an incremental manner by backup component 202 in order to reduce the amount of bandwidth and/or storage space required for implementing system 200. This can be accomplished by, for example, first dividing a file to be backed up into respective file segments (e.g., blocks, chunks, etc.) using a segmentation component 204. In one example, segmentation or chunking of a file can be performed by segmentation component 212 in a manner that facilitates de-duplication of respective file segments. For example, in a specific, non-limiting example the segmentation component 204 can divide a first version of a file into a set of uniform and/or non-uniform blocks. In another example, versions of the file can be similarly segmented to identify unique blocks between versions. For instance, upon detecting a modification to the file, segmentation component 204 can re-segment the file in a manner consistent with the segmentation of the first version such that any blocks in the file that differ in state from the first version to a second version are readily identifiable. Upon detection of unique blocks in an updated version of a file, segmentation component 204 can facilitate incremental storage of new and/or changed blocks corresponding to a file as well as other information relating to changes between respective versions of the file.

Upon generation of blocks or segments corresponding to a file, various blocks corresponding to respective files and/or file updates can be provided to a segment distribution component 206. Segment distribution component 206 can, in turn, distribute the blocks among one or more storage locations 106. Storage locations 106 can correspond or be associated with, for example, peer machines in a local network, a cloud storage service and/or another suitable Internet-based storage location, and/or any other storage site. Techniques for distributing information among network storage locations are described in further detail infra. By way of specific, non-limiting example, blocks can be pre-configured to a uniform size (e.g., 4 kilobytes (kb)) It should be appreciated, however, that any suitable block size be utilized.

Figure 3:
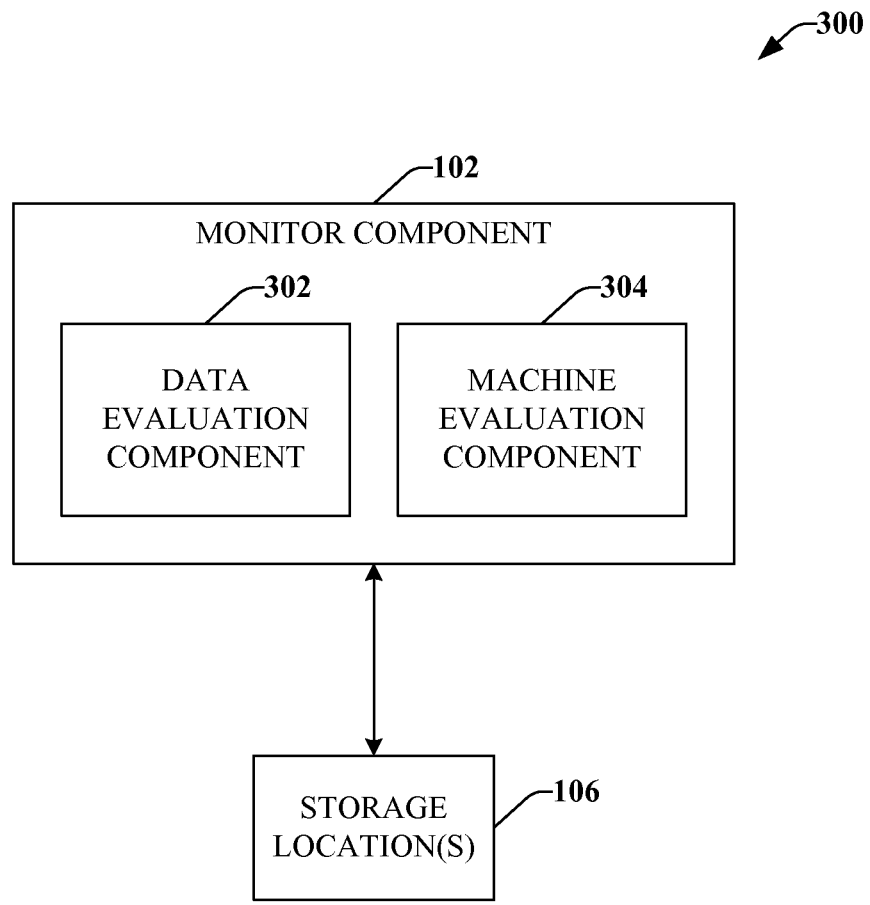
FIG. 3 illustrates a block diagram of an example system that facilitates observation and analysis of backup information and storage locations in accordance with one or more aspects.

FIG. 3 illustrates a system 300 that facilitates observation and analysis of backup information and storage locations in accordance with one or more aspects. As FIG. 3 illustrates, system 300 can include a monitor component 302 that can observe backup information and/or storage locations to acquire data that relates to properties, characteristics, or trends associated with the storage locations. The acquired data can be employed to facilitate intelligent distribution of backup data among the storage locations. In addition, the data can facilitate adaptive re-allocations and proactive shifting of data in response to changes in backup data or storage locations.

In accordance with one aspect, the monitor component 102 can include a data evaluation component 302 that analyzes backup data retained by storage locations 106. In one example, the data evaluation component 302 can monitor backup data (e.g., blocks of data) to track accesses to individual blocks. Through access tracking, the data evaluation component 302 can ascertain access frequency for a respective block of data. It is to be appreciated that the access frequency can be over a variety of time periods. For instance, access frequency can be characterized over an hour, a day, a week, a month and so on. In addition, access frequency can be provided as a total frequency since generation of the block of data. In another example, the data evaluation component 302 can maintain a time of creation for a block of data. In another aspect, the data evaluation component 302 can monitor availability of a block of backup data. For example, the data evaluation component 302 can count numbers of replica copies of respective blocks of backup data that are distributed among storage locations 106.

In accordance with another aspect, the monitor component 102 can include a machine evaluation component 304 that analyzes storage locations 106. In one example, the machine evaluation component 304 can ascertain properties of the storage locations 106. In addition, properties of the storage locations 106 can be tracked to monitor changes over time. The properties can include health of respective storage locations, storage capacity (e.g., total and/or available capacity) of storage locations, availability of storage locations (e.g., downtime, uptime, etc.), bandwidth utilization of storage locations, or predicted latency times for transmission of data between respective storage locations. Information gathered through monitoring the storage locations 106 can facilitate predicting failures and proactively shifting backup data to optimal locality to a failing machine to effectuate efficient recovery with low latency. In addition, the information can facilitate optimal placement of backup data that maximize availability while reducing latency, storage costs, and bandwidth costs.

Figure 4:
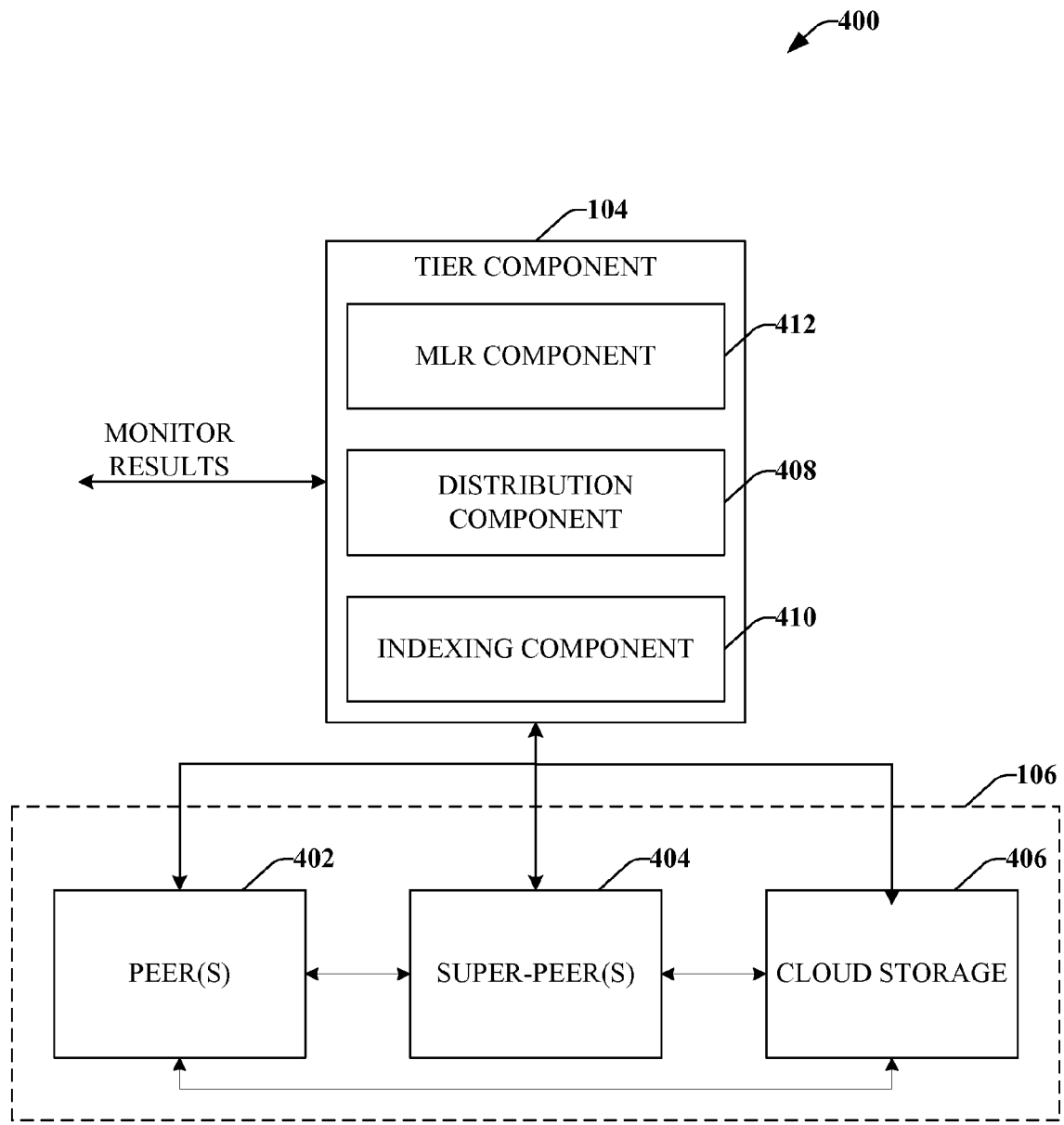
FIG. 4 illustrates a block diagram of an example system that facilitates intelligent distribution of backup information to storage locations in accordance with various aspects.

Turning now to FIG. 4, illustrated is a system 400 that facilitates intelligent distribution of backup information to storage locations in accordance with various aspects. In accordance with one aspect, a hybrid peer-to-peer (P2P) and cloud based architecture can be utilized by system 400. For instance, tier component 104 can disseminate or re-allocate backup information across storage locations 106. The storage locations 106 can include one or more trusted peers such as peer(s) 402 and/or super peer(s) 404, as well as one more cloud storage locations 406. As further illustrated in system 400, peer(s) 402, super-peer(s) 404, and/or cloud storage 406 can be further operable to communicate blocks of backup data, and/or other backup information between each other. In addition, it can be appreciated that tier component 104, any other components of system 400, and/or monitor component 102 described with reference to previous figures could additionally be associated with one or more peers 402, superpeers 404, or entities associated with cloud storage 406. Further detail regarding techniques by which peer(s) 402, superpeer(s) 404, and cloud storage 406 can be utilized, as well as further detail regarding the function of such entities within a hybrid architecture, is provided infra.

In an aspect, the tier component 104 creates virtual layers or tiers of backup data across the storage locations 106. Backup data is distributed among the layers to such that availability and optimal locality is maintained while reducing storage costs, bandwidth costs, and latency time upon restoration. The tier component 104 can generate virtual layers through distribution of blocks (e.g., backup data) to one or more of peers 402, super peers 404, or cloud storage 406. The tier component 104 can employ monitor results from the monitor component 102 described supra to facilitate creation and maintenance of the virtual layers.

In accordance with another aspect, the tier component 404 can include a distribution component 408 that allocates portions of backup data (e.g., blocks, chunks, etc.) to storage locations 106 in accordance with monitor results. In one example, the distribution component 408 can utilize access frequencies and ages of blocks of backup data to designate blocks as hot or cold. Hot data refers to blocks of backup data that are frequently accessed and/or recently created (e.g., recently backed up) while cold data refers to data that is infrequently accessed and/or created a long time ago. The distribution component 408 can allocate hot data to storage locations that provide optimal locality to a possible restoring machine such as peers 402 and/or super peers 404. Cold data can be placed to storage locations with less optimal locality but cheaper, abundant storage such as super peer 404 and cloud storage 406.

In another example, the distribution component 408 can make distribution decisions based upon availability of backup data as provided in the monitor results. Hot data, for instance, can be spread among peers 402 and unique de-duplicated blocks of backup data (e.g., blocks with few duplicates) can have additional replicants generated and stored in locations with high reliability (e.g., super peer 404 or cloud 406) to increase availability. Cold data can be incrementally shifted to reliable storage locations such as cloud storage 406 during off-peak times or spaced out times. Accordingly, availability of cold data can be lowered among peers 402 or super peers 404 to reduce storage costs. In addition, cold data can be subjected to compression techniques to further reduce storage footprint.

The distribution component 408 can re-allocate data based upon information gathered from monitoring storage locations 106. For example, failures of storage locations can be predicted and backup data can be re-allocated accordingly. For instance, backup data needed to recover a failed machine can be re-allocated to location within optimal locality to the failed machine such that restoration latency will be minimized. In another example, the distribution component 408 can reallocate or redistribute backup data from storage locations showing indications of critical failures.

In accordance with another aspect, tier component 104 can include and/or otherwise be associated with a indexing component 412, which can maintain an index that lists relationships between blocks of backup data and storage locations to which the blocks have been distributed. In one example, the indexing component 410 can add, delete, and/or modify entries in the index when the tier component 104 renders distribution and/or replication decisions regarding backup data blocks. In another example, the index can be distributed along with backup data represented therein to one more peers 402, super peers 404, or cloud storage 406. It is to be noted without limitation or loss of generality that an entire index can be replicated and stored at one or more locations, or that an index can be divided and distributed, in chunks, among multiple locations.

As system 400 further illustrates, a machine learning and reasoning (MLR) component 412 can be employed to facilitate intelligent, automated selection of storage locations for respective information. In one example, MLR component 412 can utilize any suitable artificial intelligence (AI), machine learning, and/or other algorithm(s) generally known in the art. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 5:
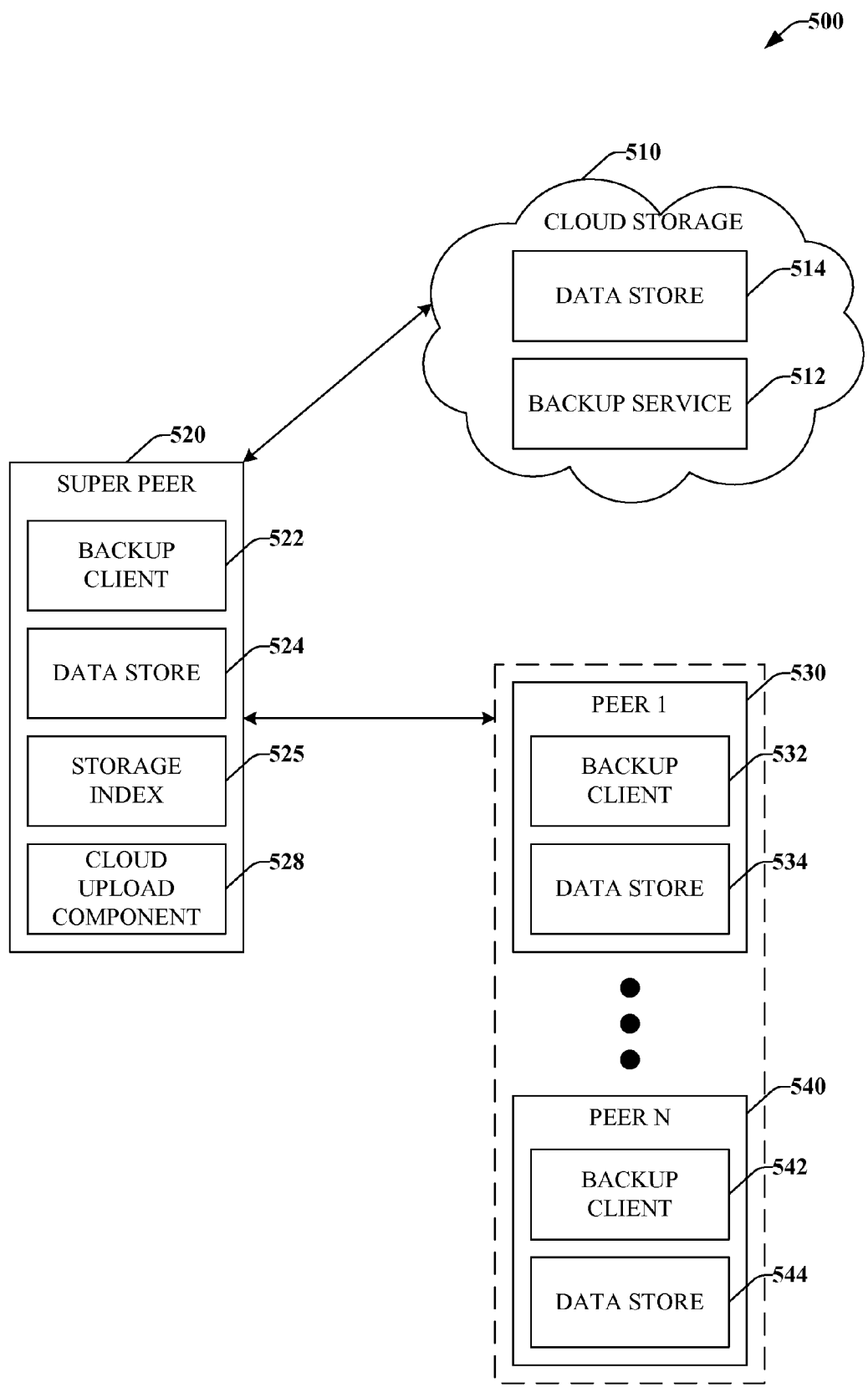
FIG. 5 illustrates a block diagram of an example network architecture that can be utilized in connection with various aspects described herein.

Referring next to FIG. 5, a diagram 500 is provided that illustrates an example network implementation that can be utilized in connection with various aspects described herein. As diagram 500 illustrates, a network implementation can utilize a hybrid peer-to-peer and cloud-based structure, wherein a cloud service provider 510 interacts with one or more super peers 520 and one or more peers 530-540.

In accordance with one aspect, cloud service provider 510 can be utilized to remotely implement one or more computing services from a given location on a network/internetwork associated with super peer(s) 520 and/or peer(s) 530-540 (e.g., the Internet). Cloud service provider 510 can originate from one location, or alternatively cloud service provider 510 can be implemented as a distributed Internet-based service provider. In one example, cloud service provider 510 can be utilized to provide backup functionality to one or more peers 520-540 associated with cloud service provider 510. Accordingly, cloud service provider 510 can implement a backup service 512 and/or provide associated data store 514.

In one example, data storage 514 can interact with a backup client 522 at super peer 520 and/or backup clients 532 or 542 at respective peers 530 or 540 to serve as a central storage location for data residing at the respective peer entities 520-540. In this manner, cloud service provider 510, through data storage 514, can effectively serve as an online "safe-deposit box" for data located at peers 520-540. It can be appreciated that backup can be conducted for any suitable type(s) of information, such as files (e.g., documents, photos, audio, video, etc.), system information, or the like. Additionally or alternatively, distributed network storage can be implemented, such that super peer 520 and/or peers 530-540 are also configured to include respective data storage 524, 534, and/or 544 for backup data associated with one or more machines on the associated local network. In another example, techniques such as de-duplication, incremental storage, and/or other suitable techniques can be utilized to reduce the amount of storage space required by data storage 514, 524, 534, and/or 544 at one or more corresponding entities in the network represented by diagram 500 for implementing a cloud-based backup service.

In accordance with another aspect, cloud service provider 510 can interact with one or more peer machines 520, 530, and/or 540. As illustrated in diagram 500, one or more peers 520 can be designated as a super peer and can serve as a liaison between cloud service provider 510 and one or more other peers 530-540 in an associated local network. While not illustrated in FIG. 5, it should be appreciated that any suitable peer 530 and/or 540, as well as designated super peer(s) 520, can directly interact with cloud service provider 510 as deemed appropriate. Thus, it can be appreciated that cloud service provider 510, super peer(s) 520, and/or peers 530 or 540 can communicate with each other at any suitable time to synchronize files or other information between the respective entities illustrated by diagram 500.

In one example, super peer 520 can be a central entity on a network associated with peers 520-540, such as a content distribution network (CDN), an enterprise server, a home server, and/or any other suitable computing device(s) determined to have the capability for acting as a super peer in the manners described herein. In addition to standard peer functionality, super peer(s) 520 can be responsible for collecting, distributing, and/or indexing data among peers 520-540 in the local network. For example, super peer 520 can maintain a storage index 526, which can include the identities of respective files and/or file segments corresponding to peers 520-540 as well as pointer(s) to respective location(s) in the network and/or in cloud data storage 514 where the files or segments thereof can be found. Additionally or alternatively, super peer 520 can act as a gateway between other peers 530-540 and a cloud service provider 510 by, for example, uploading respective data to the cloud service provider 510 at designated off-peak periods via a cloud upload component 528.

It is to be appreciated that the data stores illustrated in system 500 (e.g., data stores 514, 524, 534, and 544) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data stores can be a server, a database, a hard drive, a pen drive, an external hard drive, a portable hard drive, and the like.

Figure 6:
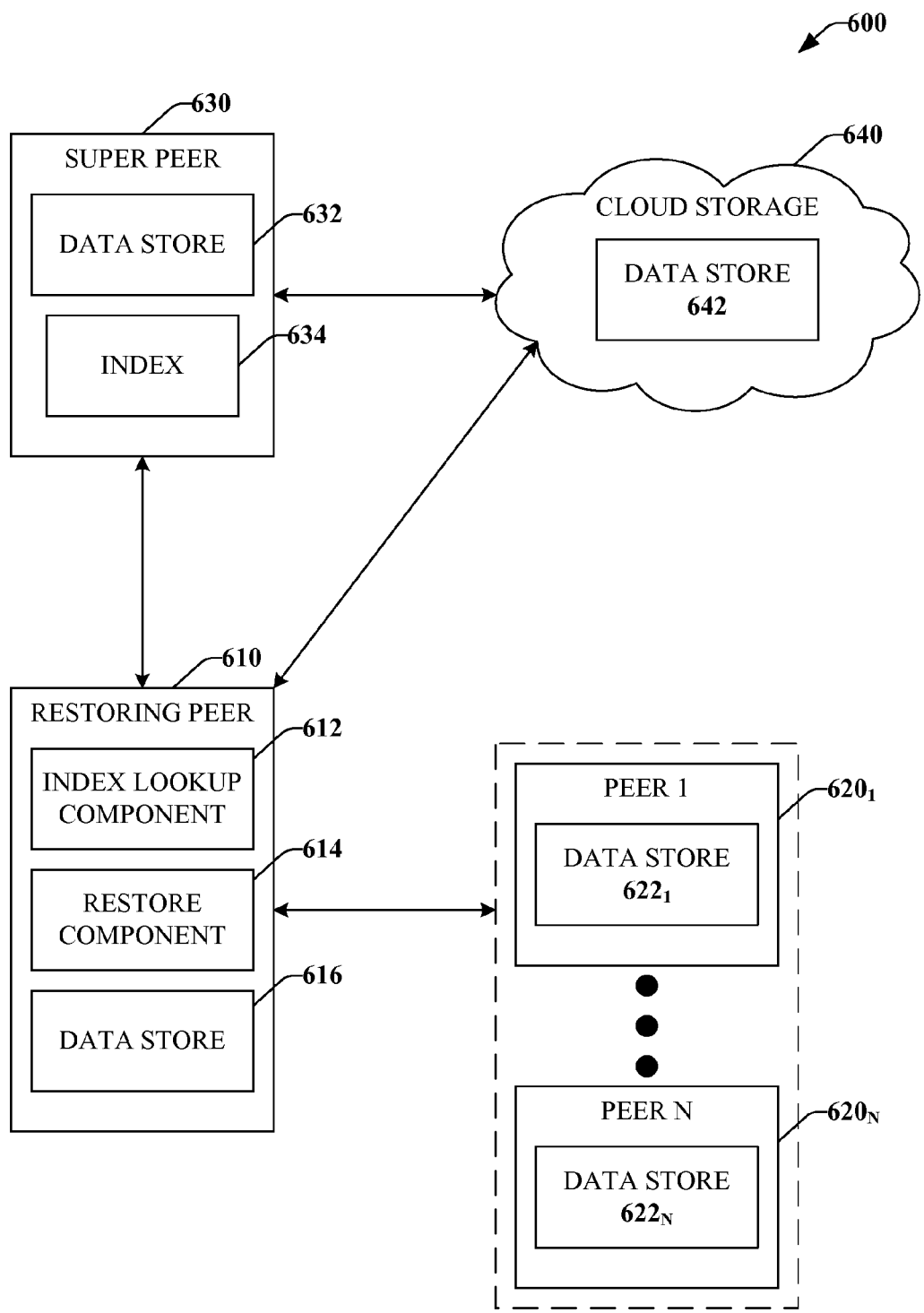
FIG. 6 illustrates a block diagram of an example system that facilitates conducting a restore in a hybrid cloud-based and peer-to-peer backup architecture in accordance with various aspects.

Referring now to FIG. 6, illustrated is a system 600 that facilitates conducting a restore in a hybrid cloud-based and peer-to-peer backup architecture in accordance with various aspects. As system 600 illustrates, a hybrid P2P/cloud backup architecture can be utilized, wherein backup information corresponding to one or more computing devices is distributed among one or more peers machines 610 or 620 and/or one or more super-peer machines 630, as well as one or more cloud storage locations 640.

In one example, peer machines 620 can include respective data stores 622, which can be utilized to receive and maintain backup information corresponding to one or more files or delta updates to respective files. Files and/or updates (e.g., backup versions) stored in data stores 622 can be associated with, for example, a restoring peer 610 (e.g., as created by a versioning component 102 and distributed by a distribution component 104). In addition, the restoring peer 610 can additionally or alternatively include a data store 616 for locally storing backup information corresponding to files and/or versions of files residing locally at restoring peer 610.

In another example, one or more super peers 630 in system 600 can additionally include a data store 632 as well as a catalogue 634, which can provide a master listing of file versions stored within system 600 and their respective locations (e.g., as created by an cataloguing component 312). Although catalogue 634 is illustrated as located at super peer 630 in system 600, it should be appreciated that some or all of catalogue 634 could additionally or alternatively be located at one or more peers 610 and/or 640 as well as at cloud storage 640.

In accordance with one aspect, the restoring peer 610 can include a restore component 614 that can issue a restore request. The restore request can be a request to roll-back a version of file retained by the restoring peer 610 with a previous version distributed in system 600. In another example, the restore request can be a command to recover a version (e.g., a most recent version, an original version and/or any version therebetween). A catalogue lookup component 612 can obtain metadata from catalogue 634 and/or any other suitable source that points to the respective locations of file versions to be restored.

Based on the locations obtained by catalogue lookup component 612, the restore component 614 can pull file versions from their corresponding locations within data store(s) 622, 632, 642, and/or any other suitable storage location within system 600. File versions can be complete entireties of files and/or incremental delta chunks that reflect changes between a version and an immediately previous version. Accordingly, in one example, a restore can be conducted by pulling incremental delta chunks necessary to recreate a desired version. In another example, a complete rendition of the desired version can be located and obtained.

In accordance with another example, the hybrid P2P/cloud backup architecture of system 600 can be exploited to minimize latency and/or bandwidth required to restore one or more file versions at a restoring peer 610. For example, restore component 614 can analyze system 600 to facilitate pulling of respective file versions from the path of least resistance through system 600. Thus, for example, in the event that a given file version resides at data store 622 or 632 at a peer 620 or super peer 630 as well as in cloud storage 640, preference can be given to pulling the block from the nearest network nodes first. As a result, a peer 620 and/or super peer 630 can be prioritized over cloud storage 640 to minimize the latency and bandwidth usage associated with communicating with cloud storage 640. In addition, restore component 614 can analyze availability of respective nodes in system 600, relative network loading and/or other factors to facilitate intelligent selection of nodes from which to obtain file versions. Accordingly, the restoring peer 610 can be configured to first attempt to obtain file versions from a peer machine 620 or a super peer 630, falling back on cloud storage 640 only if no peers 620 and/or 630 with required file versions are available. In an alternative example, super peer 630 and/or another entity from which the restoring peer 610 accesses catalogue 634 can utilize similar network analysis in order to select an optimal location from among a plurality of locations that retains a file version as indicated by the catalogue 634. Once selected, such location(s) can be subsequently provided to a restoring peer 610.

Figure 7:
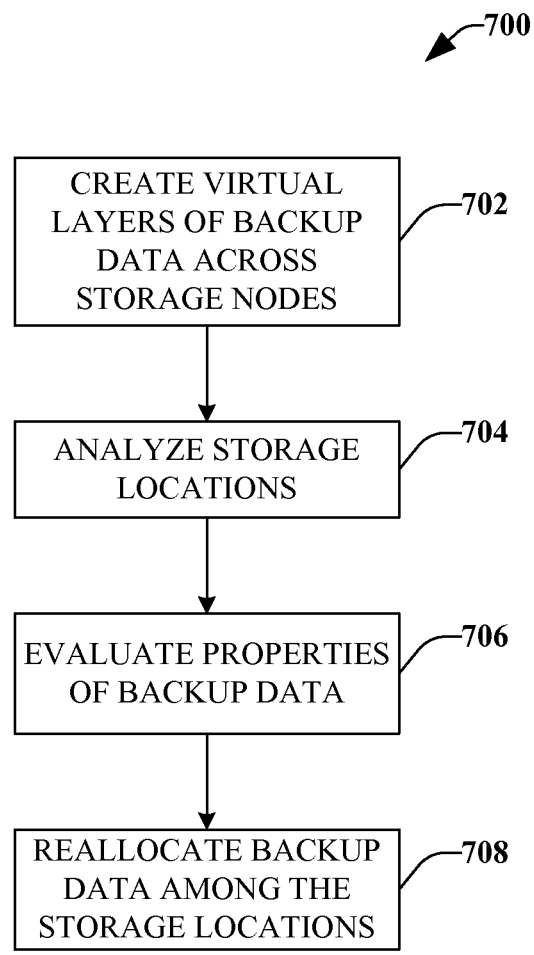
FIG. 7 illustrates an exemplary methodology for reallocating data among layers of data implemented on one or more storage nodes in accordance with various aspects.
Figure 8:
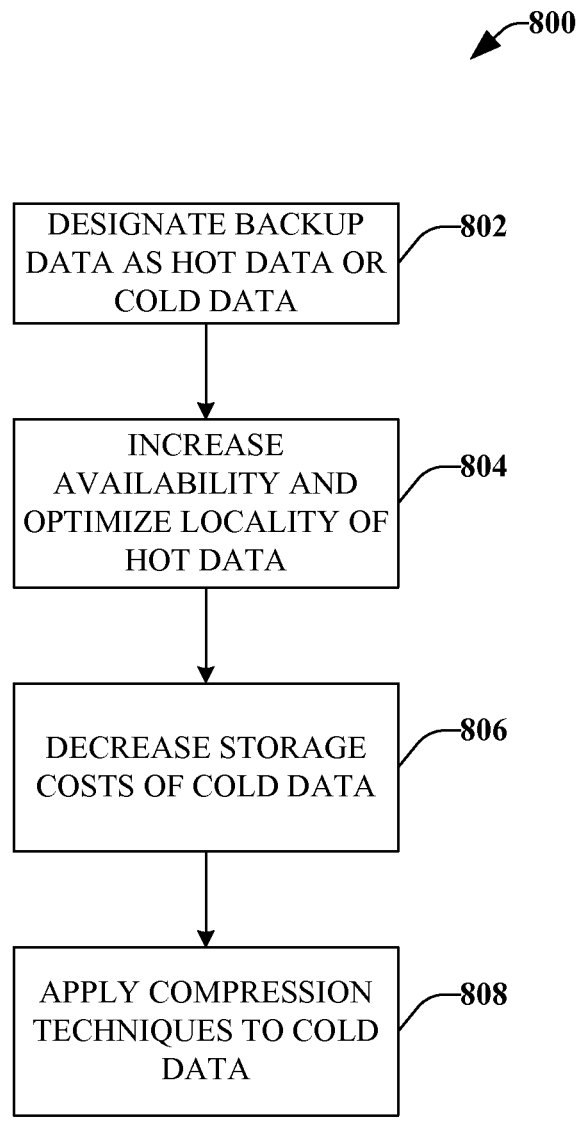
FIG. 8 illustrates an exemplary methodology for reallocating backup data based upon usage information of the data in accordance with various aspects.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 7, a method 700 for reallocating data among layers of data implemented on one or more storage nodes is illustrated. At reference numeral 702, virtual layers of backup data can be created across storage nodes. The backup data can be files, system images, or other information managed by backup system. In one example, the backup system can be a hybrid peer-to-peer/cloud backup system. In another example, the virtual layers can be constructed relative to an origin location (e.g., a restoring client machine) such that locality of backup data is prioritized/At reference numeral 704, storage locations are analyzed. In an example, the storage locations can be monitored to discover properties. Properties can include health of respective storage locations, storage capacity (e.g., total and/or available capacity) of storage locations, availability of storage locations (e.g., downtime, uptime, etc.), bandwidth utilization of storage locations, or predicted latency times for transmission of data between respective storage locations. At reference numeral 706, properties of backup data are evaluated. The properties can include access frequency, age, or availability (e.g., number of replicas). At reference numeral 708, backup data can be reallocated among the storage locations. In one example, the reallocation can be based at least in part on the properties of the storage locations and/or backup data. For example, backup data can be shifted to optimal locality in response detection of critical failures at a storage location or other client machine, wherein such shifted data can be utilized to recovery the failing machine.

Turning now to FIG. 8, a method 800 for reallocating backup data based upon usage information of the data is illustrated. At reference numeral 802, backup data is designated as hot data or cold data. Hot data refers to backup data that is frequently accessed and/or recently generated (e.g., data recently backed up). It can be inferred that hot data is more likely to be restored. Cold data refers to backup information that is infrequently accessed and/or older. It can be inferred that cold data is least likely to be restored. At reference numeral 804, availability of hot data is increase. In addition, hot data is distributed to provide optimal locality to peers most likely to restore the hot data. In one example, hot data can be retained in peers in a hybrid peer-to-peer/cloud backup system. Moreover, peers in close network proximity to likely restoration points can be selected to store hot data. In addition, replica copies of hot data can be stored in reliable storage locations such as a super peer or cloud storage location to increase availability. At reference numeral 806, storage costs of cold data can be decreased. In accordance with an example, cold data can be transferred from peers to super peers. In addition, cold data stored at a super peer can be shifted to cloud storage during off peak times or other time periods in which bandwidth utilization can be minimized. At reference numeral 808, compression techniques can be applied to cold data to further reduce storage footprint.

Figure 9:
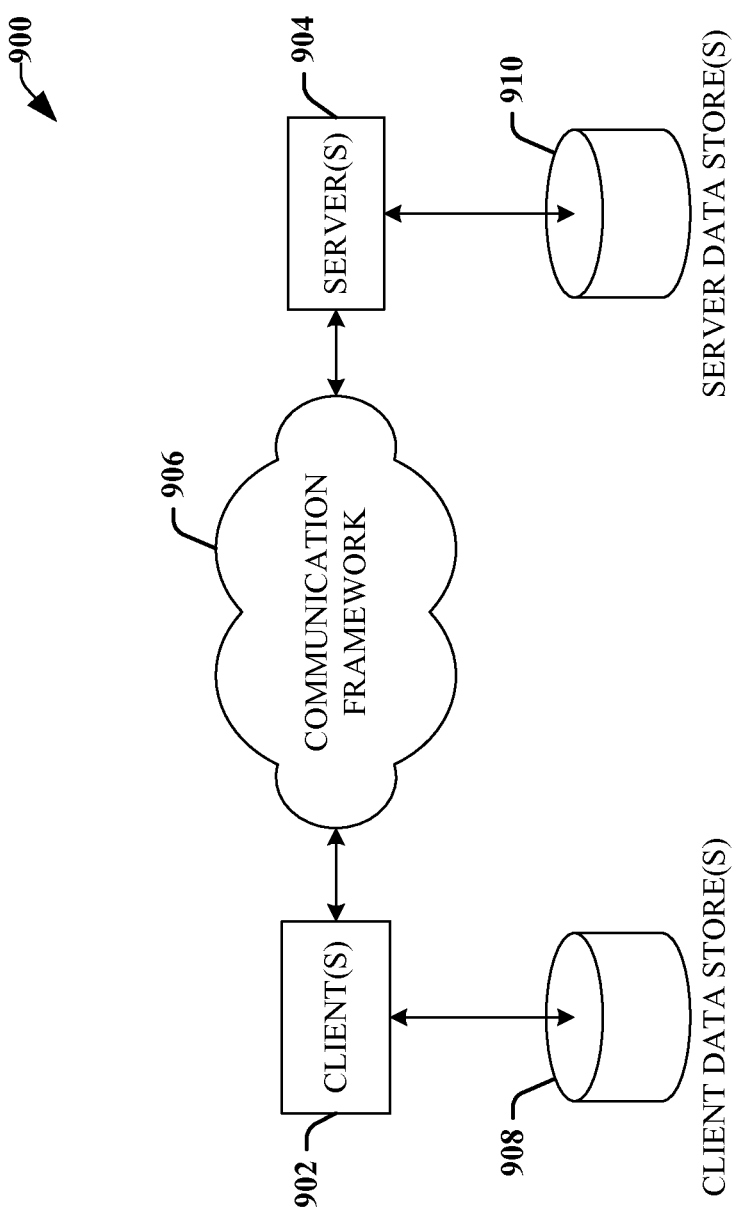
FIG. 9 illustrates an exemplary networking environment, wherein the novel aspects of the claimed subject matter can be employed.
Figure 10:
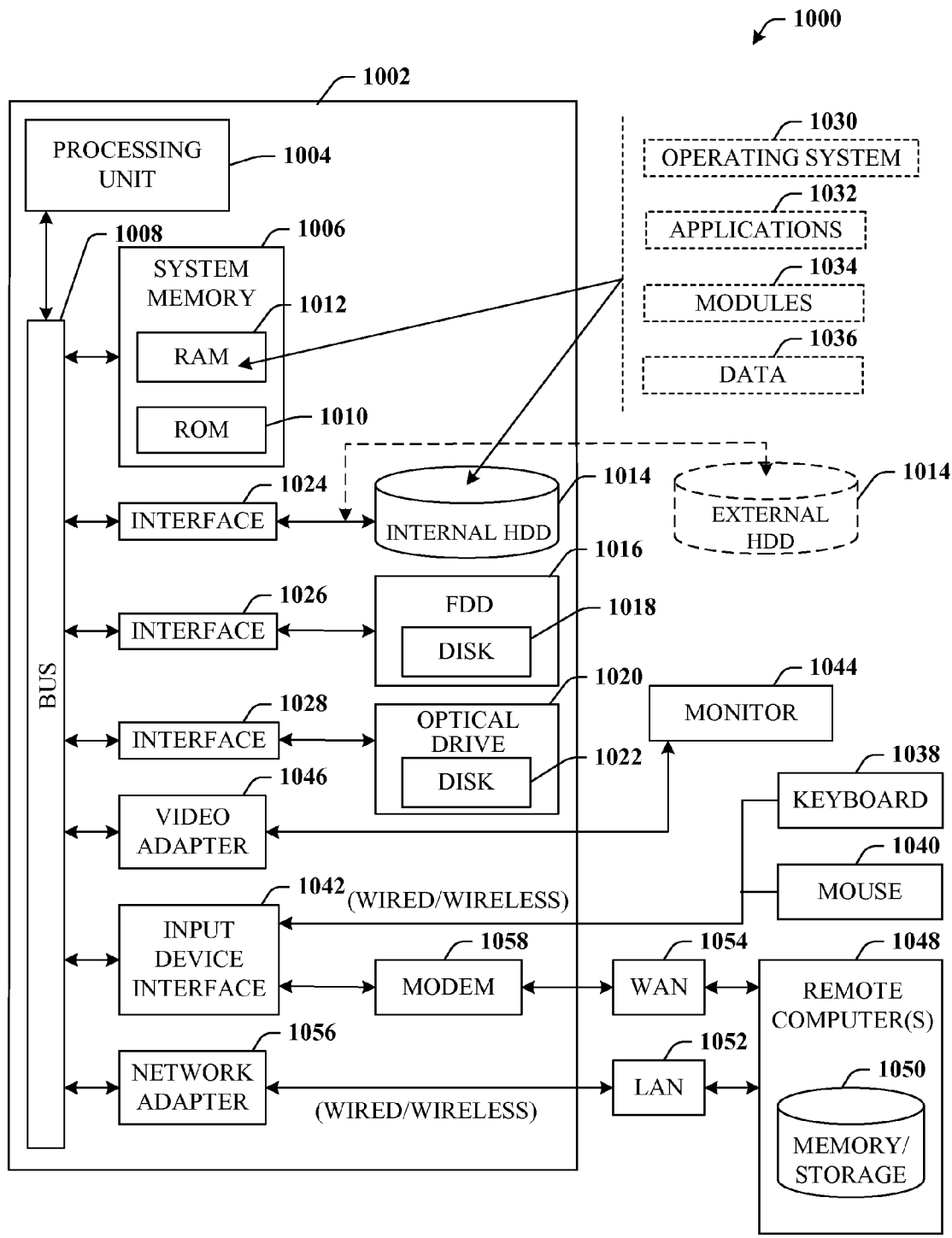
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, client machines such as peers and super-peers, as well as cloud storage locations can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Referring now to FIG. 9, there is illustrated a schematic block diagram of an exemplary computer compilation system operable to execute the disclosed architecture. The system 900 includes one or more client(s) 902. The client(s) 902 can be hardware and/or software (e.g., threads, processes, computing devices). In one example, the client(s) 902 can house cookie(s) and/or associated contextual information by employing one or more features described herein.

The system 900 also includes one or more server(s) 904. The server(s) 904 can also be hardware and/or software (e.g., threads, processes, computing devices). In one example, the servers 904 can house threads to perform transformations by employing one or more features described herein. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

With reference to FIG. 10, an exemplary environment 1000 for implementing various aspects described herein includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, a serial port, an IEEE-1394 port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11(a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates intelligent allocation of backup data among a set of storage locations in a hybrid backup environment, comprising:
   a processor coupled to a memory that retains computer-executable instructions, the processor executes:
   a monitor component that identifies properties of backup data stored by one or more cloud storage locations and one or more peer-to-peer storage locations, and properties of the one or more cloud storage locations and the one or more peer-to-peer storage locations; and
   a tier component that implements virtual layers of backup data across the one or more cloud storage locations and the one or more peer-to-peer storage locations, the one or more cloud storage locations being remote from the one or more peer-to-peer storage locations, in accordance with the properties of the backup data and the properties of the one or more cloud storage locations and the one or more peer-to-peer storage locations, the tier component distributes backup data among the one or more cloud storage locations and the one or more peer-to-peer storage locations to ensure availability while reducing storage utilization and latency upon restore of the backup information, wherein frequency of access to the backup data of the one or more cloud storage locations and the one or more peer-to-peer storage locations is utilized to distribute the backup data among the one or more cloud storage locations and the one or more peer-to-peer storage locations, and wherein the tier component distributes backup data among each of the one or more cloud storage locations and the one or more peer-to-peer storage locations by dividing a file into a plurality of segments and distributing a first portion of the plurality of segments to the one or more cloud storage locations and a second portion of the plurality of segments to the one or more peer-to-peer storage locations, remote from the one or more cloud storage locations.

2. The system of claim 1, wherein the monitor component includes a data evaluation component that analyzes backup data to ascertain the properties of the backup data.

3. The system of claim 1, wherein the monitor component includes a machine evaluation component that observes at least one of the one or more cloud storage locations and the one or more peer-to-peer storage locations to determine the properties of the one or more cloud storage locations and the one or more peer-to-peer storage locations.

4. The system of claim 1, wherein the tier component includes a distribution component that replicates a block of backup data to at least one of the one or more cloud storage locations and/or the one or more peer-to-peer storage locations based at least in part on the properties of the backup data or the one or more cloud storage locations and the one or more peer-to-peer storage locations.

5. The system of claim 1, wherein the tier component includes an indexing component that maintains an index, the indexing component at least one of adds, deletes, or modifies entries in the index when distribution decisions are rendered by the tier component.

6. The system of claim 5, wherein the index comprises a listing of relationships between backup versions and at least one of the one or more cloud storage locations and the one or more peer-to-peer storage locations to which the backup versions have been distributed.

7. The system of claim 1, wherein the properties of the backup data include at least one of frequency of access to the backup data, availability of the backup data, or time since creation of the backup data.

8. The system of claim 7, wherein frequently accessed backup data is inferred to be most likely to be restored, and wherein backup data is frequently accessed when the backup data is accessed a predetermined number of times within a specific time period.

9. The system of claim 8, wherein the tier component distributes frequently accessed data to at least one of the one or more cloud storage locations and the one or more peer-to-peer storage locations having minimal latency and highest availability.

10. The system of claim 8, wherein the tier component replicates copies of frequently accessed backup data to at least one of the one or more cloud storage locations and the one or more peer-to-peer storage locations.

11. The system of claim 7, wherein infrequently accessed backup data is inferred to be least likely to be restored, and wherein backup data is infrequently accessed when the backup data is accessed less than a predetermined number of times within a specific time period.

12. The system of claim 11, wherein the tier component allocates infrequently accessed backup data to remote storage nodes.

13. The system of claim 1, wherein the properties of at least one of the one or more cloud storage locations and the one or more peer-to-peer storage locations comprises health of each respective one or more cloud storage locations and one or more peer-to-peer storage locations, storage capacity of each respective one or more cloud storage locations and/or the one or more peer-to-peer storage locations, availability of each respective one or more cloud storage locations and/or the one or more peer-to-peer storage locations, bandwidth utilization of each respective one or more cloud storage locations and/or the one or more peer-to-peer storage locations, or predicted latency times for transmission of data between each respective the one or more cloud storage locations and/or the one or more peer-to-peer storage locations.

14. The system of claim 1, wherein the tier component detects a probability of a failure of at least one of the one or more cloud storage locations and the one or more peer-to-peer storage locations or a client machine based upon the properties of at least one of the one or more cloud storage locations and the one or more peer-to-peer storage locations.

15. The system of claim 14, wherein the tier component proactively allocates backup data prior to an occurrence of the failure.

16. The system of claim 1, wherein the tier component creates the virtual layers of the backup data through application of a higher level of preference on storage locations corresponding to the one or more peer-to-peer storage locations than to storage locations corresponding to the one or more cloud storage locations.

17. A method for intelligently tiering backup information in a distributed hybrid backup environment, comprising: employing a processor executing computer-executable instructions stored on computer-readable storage medium to implement the following acts:

creating virtual layers of backup information across one or more peer-to-peer storage locations and one or more cloud storage locations of the hybrid backup environment, the one or more peer-to-peer storage locations being remote from the one or more cloud storage locations;

monitoring backup information to ascertain properties of the backup information, the properties including each of access frequency, availability, and time since creation of the backup information; and dynamically reallocating backup information across each of the one or more cloud storage locations and the one or more peer-to-peer storage locations, based upon the properties of the backup information, to ensure availability of the backup information while minimizing storage costs and latency upon restoration of the backup information, wherein the reallocation includes moving backup information accessed less than a predetermined number of times within a specific time period from the one or more peer-to-peer storage locations to the one or more cloud storage locations during off-peak times and wherein the backup information is reallocated among each of the one or more cloud storage locations and the one or more peer-to-peer storage locations by dividing a file into a plurality of segments and distributing a first portion of the plurality of segments to the one or more cloud storage locations and a second portion of the plurality of segments to the one or more peer-to-peer storage locations remote from the cloud storage location.

18. The method of claim 17, further comprising:

designating the backup information as at least one of hot data or cold data based upon the properties of the backup information, wherein hot data is backup information that is accessed a predetermined number of times within a specific time period and cold data is backup information that is accessed less than the predetermined number of times within the specific time period;

allocating hot data to storage locations that provide optimal locality to a restore client, wherein optimal locality is provided by storing the hot data in a storage location that is close on the network to the restore client; and allocating cold data to remote storage locations that provide storage at minimum cost.

* * * * *